United States Patent [19]

Antoniak

[11] Patent Number: 5,456,607
[45] Date of Patent: Oct. 10, 1995

[54] KNOWLEDGE TESTING COMPUTER GAME METHOD EMPLOYING THE REPOSITIONING OF SCREEN OBJECTS TO REPRESENT DATA RELATIONSHIPS

[76] Inventor: Peter R. Antoniak, 8105 Shelter Creek, San Bruno, Calif. 94066

[21] Appl. No.: 195,908

[22] Filed: Feb. 14, 1994

Related U.S. Application Data

[63] Continuation of Ser. No. 948,346, Sep. 21, 1992, abandoned, which is a continuation of Ser. No. 725,878, Jun. 28, 1991, abandoned, which is a continuation of Ser. No. 450,167, Dec. 13, 1989, abandoned.

[51] Int. Cl.$^6$ .................................................. G09B 7/00
[52] U.S. Cl. ................. 434/323; 434/118; 434/307 R; 434/335; 364/411; 345/163; 273/273
[58] Field of Search .................. 434/72, 79, 80, 434/219, 220, 268, 259, 322, 323, 350, 352; 395/157, 159; 364/410, 411; 345/145, 146, 163; 273/237, 238, 271, 273

[56] References Cited

U.S. PATENT DOCUMENTS

| | | | |
|---|---|---|---|
| 458,358 | 8/1891 | Cole | 434/154 |
| 1,148,885 | 8/1915 | Barrett | 434/154 X |
| 1,597,562 | 8/1926 | Allen | 273/273 X |
| 2,175,591 | 10/1939 | Beneteau | 273/273 |
| 2,316,147 | 4/1943 | Adams | 434/154 |
| 3,564,732 | 2/1971 | Lynd | 434/167 |
| 3,729,836 | 5/1973 | Mayeda | 434/169 X |
| 4,060,915 | 12/1977 | Conway . | |
| 4,124,943 | 11/1978 | Mitchell et al. . | |
| 4,171,816 | 10/1979 | Hunt | 434/167 X |
| 4,176,470 | 12/1979 | Fosner et al. . | |
| 4,176,474 | 12/1979 | O'Sullivan | 434/210 |
| 4,201,386 | 5/1980 | Seale et al. | 434/154 X |
| 4,275,442 | 6/1981 | Underwood et al. | 273/237 X |
| 4,308,017 | 12/1981 | Laughon et al. | 434/169 |
| 4,457,719 | 7/1984 | Dittakavi et al. | 434/159 |
| 4,457,719 | 7/1984 | Dittakavi et al. | 434/159 |
| 4,505,682 | 3/1985 | Thompson . | |
| 4,511,143 | 4/1985 | Sankrithi | 273/237 X |
| 4,518,361 | 5/1985 | Conway . | |
| 4,559,598 | 12/1985 | Goldwasser et al. . | |
| 4,579,533 | 4/1986 | Anderson et al. . | |
| 4,593,904 | 6/1986 | Graves | 434/323 X |
| 4,651,299 | 3/1987 | Mujazaki et al. . | |
| 4,656,603 | 4/1987 | Dunn | 395/159 X |
| 4,812,125 | 3/1989 | Strashun | 434/224 |
| 4,829,431 | 5/1989 | Ott et al. | 434/323 |
| 4,884,972 | 12/1989 | Gasper | 434/169 X |
| 4,959,017 | 9/1990 | Thompson et al. | 434/335 X |
| 4,968,257 | 11/1990 | Yalen | 434/323 X |
| 4,978,302 | 12/1990 | Clossey | 434/335 X |
| 5,040,131 | 8/1991 | Torres | 395/157 X |
| 5,100,329 | 3/1992 | Deesen et al. | 434/362 X |
| 5,134,560 | 7/1992 | Ferriter et al. | 395/159 X |

OTHER PUBLICATIONS

Macintosh System Software User's Guide Version 6.0, 1988.
"The Puzzle Mountain" by Gyles Brandreth, Morrow Quill Paperbacks 1981, pp. 106, 115–117, 229 and 233.

Primary Examiner—Joe H. Cheng

[57] ABSTRACT

An improved process for testing knowledge and understanding in a computer game in which factual material (86) is placed in or referenced to geometric blocks (84) on a computer screen. A player is challenged (82) to move the blocks so that they relate spatially to a definition, attribute, or value of the factual material. A player moves the blocks using a computer input device, such as a mouse or joystick. The process compares the placement of the blocks with the definitions or attributes of the factual material, notifies the player, and records the results of the comparison, thus providing a simple, intuitive means of playing a knowledge testing game without the need for a keyboard.

6 Claims, 19 Drawing Sheets

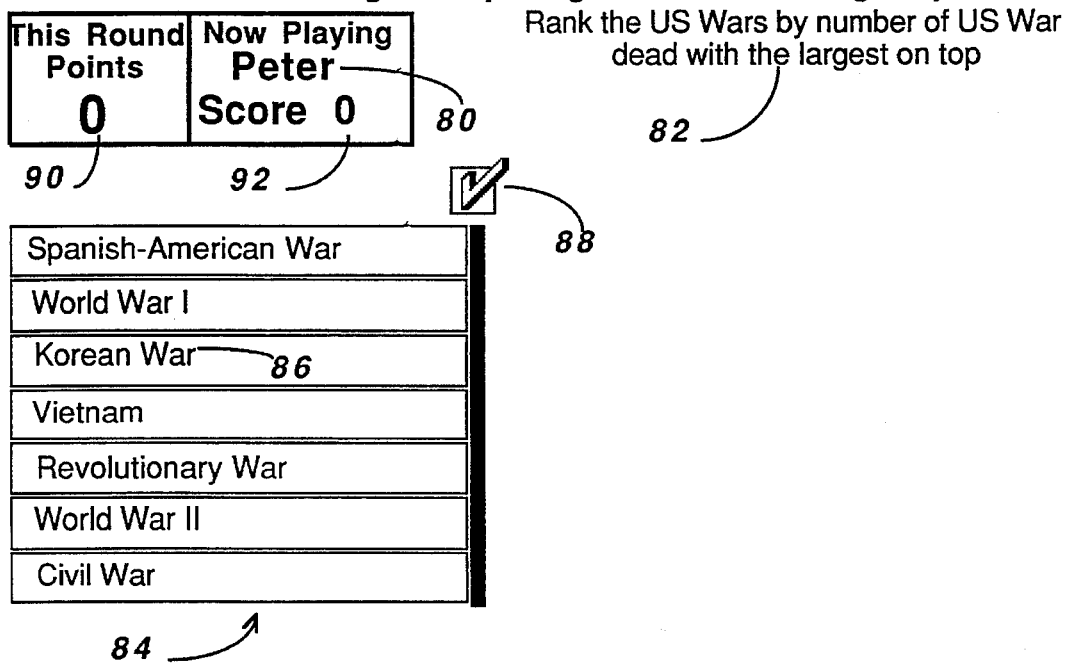
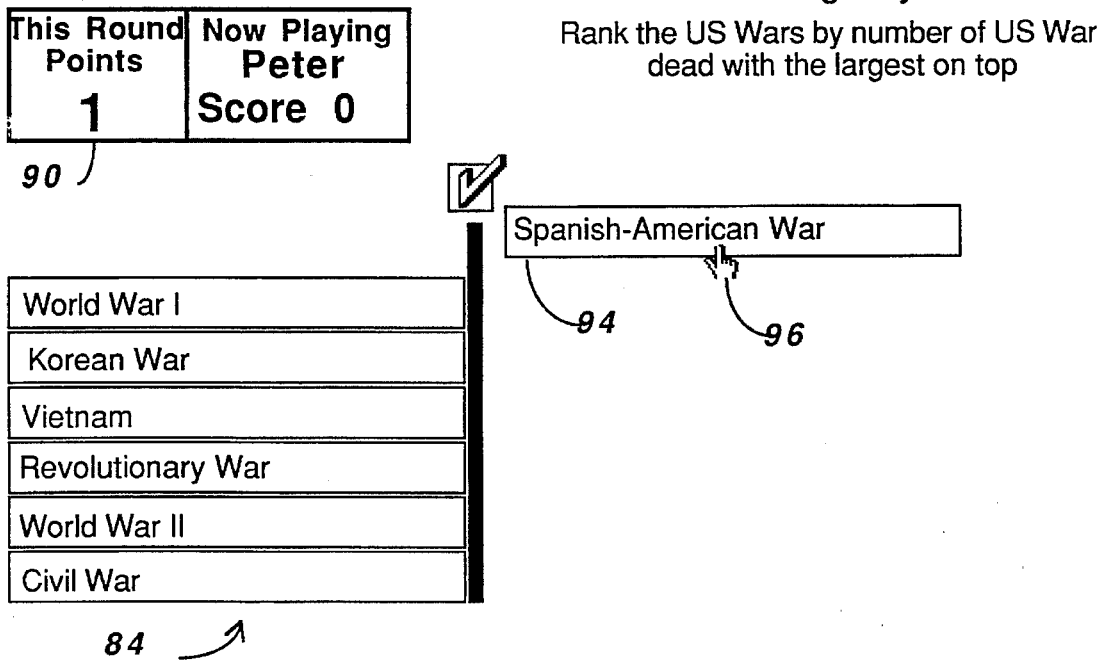

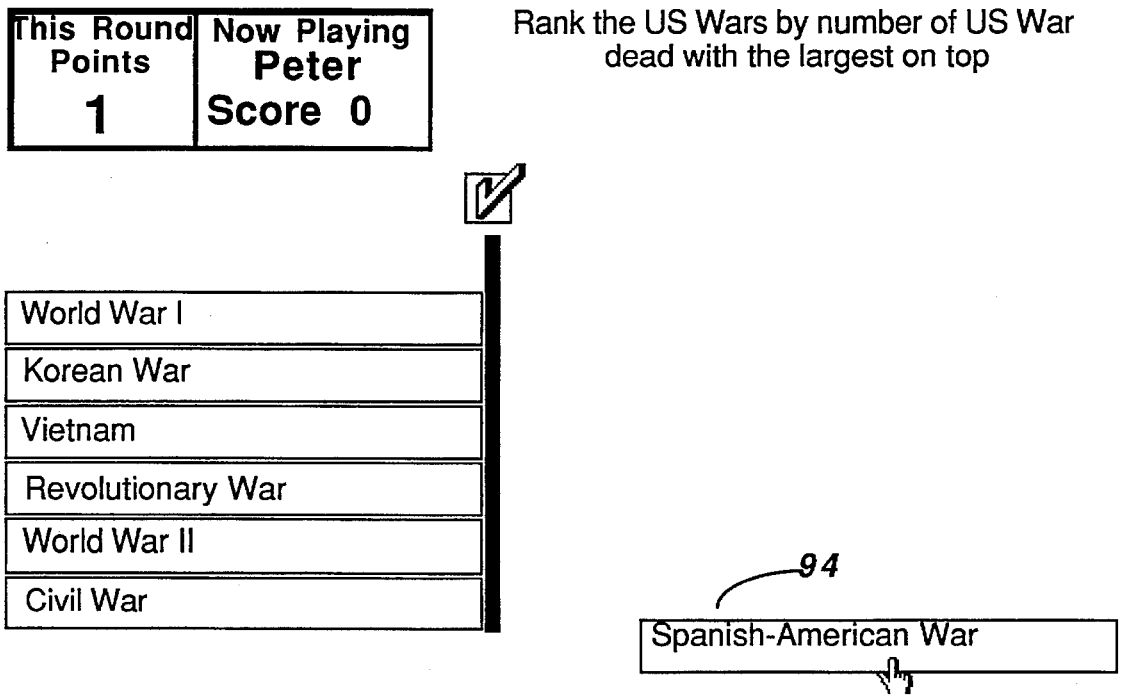
FIG 1C Final Placement of the First Block Moved
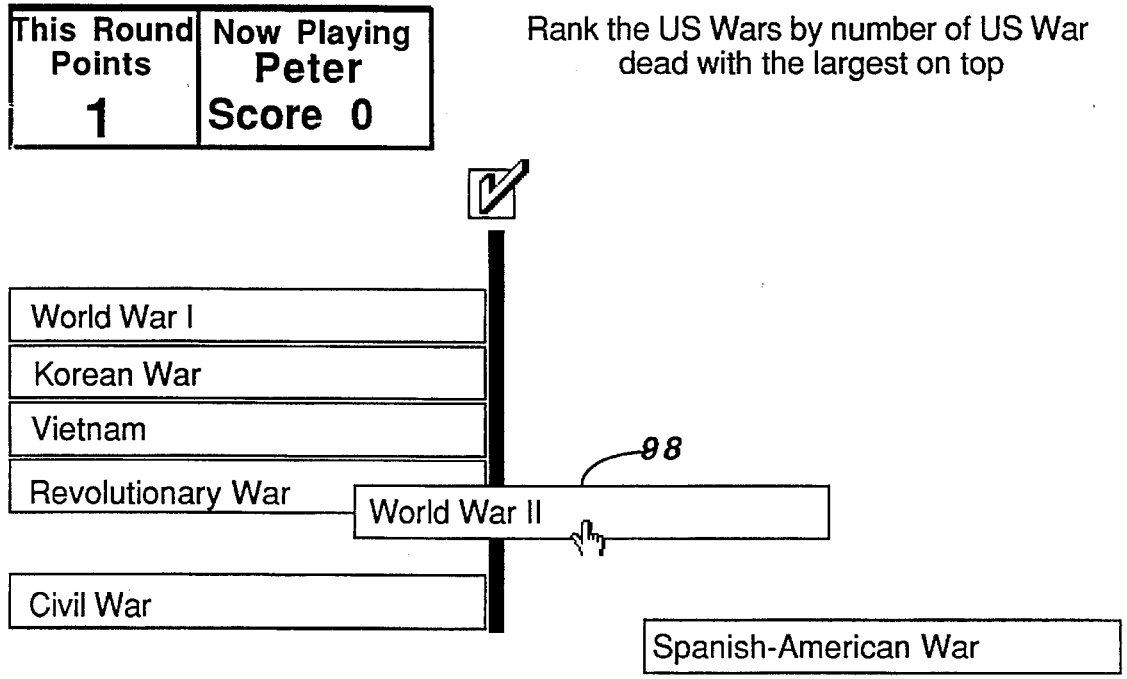
FIG 1D Movement of Second Block

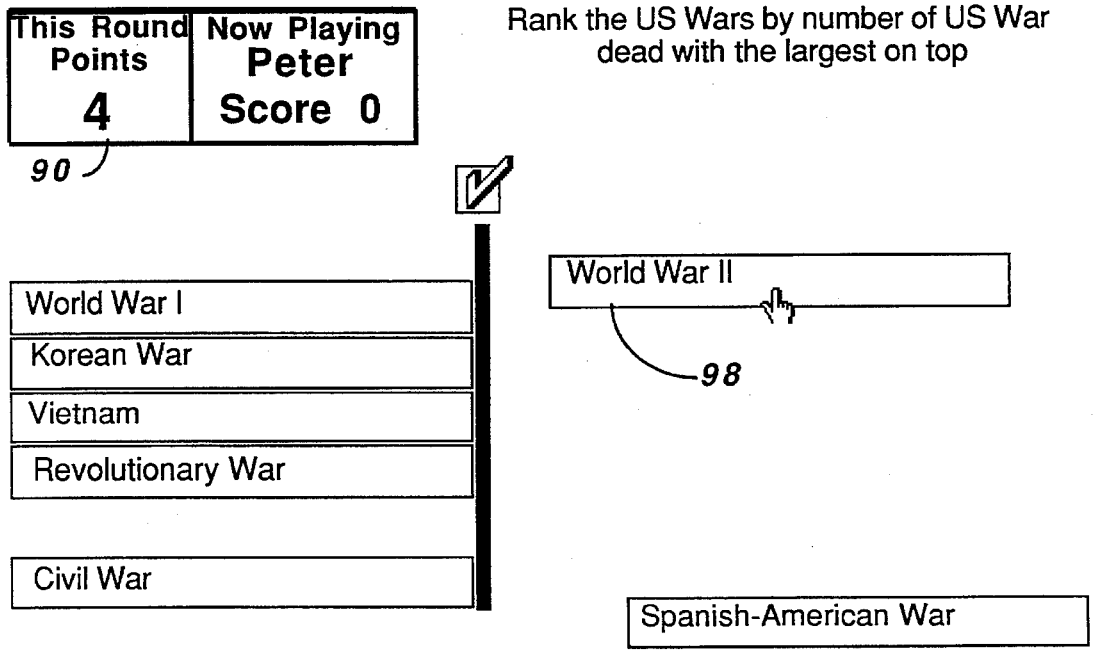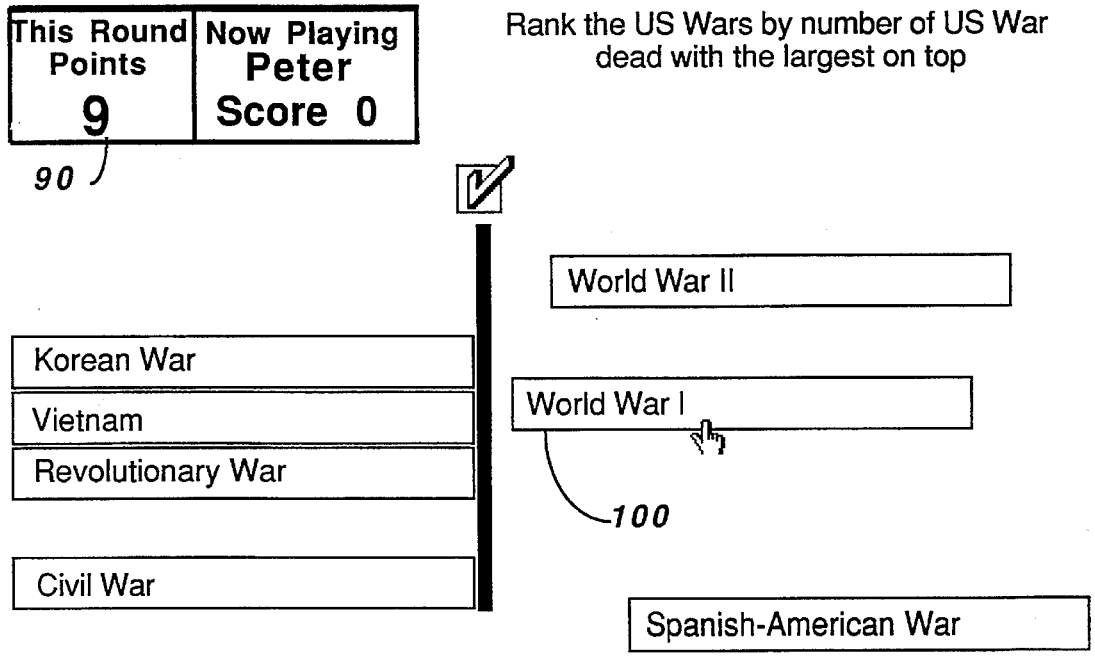

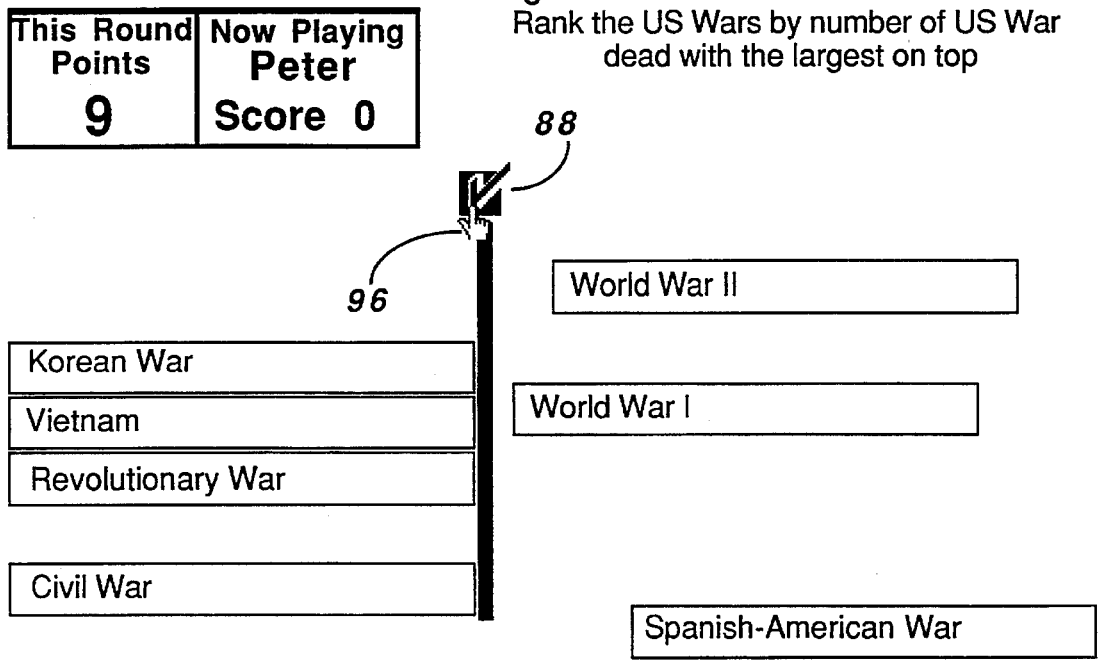
FIG 1G Pushing the "Check" Button
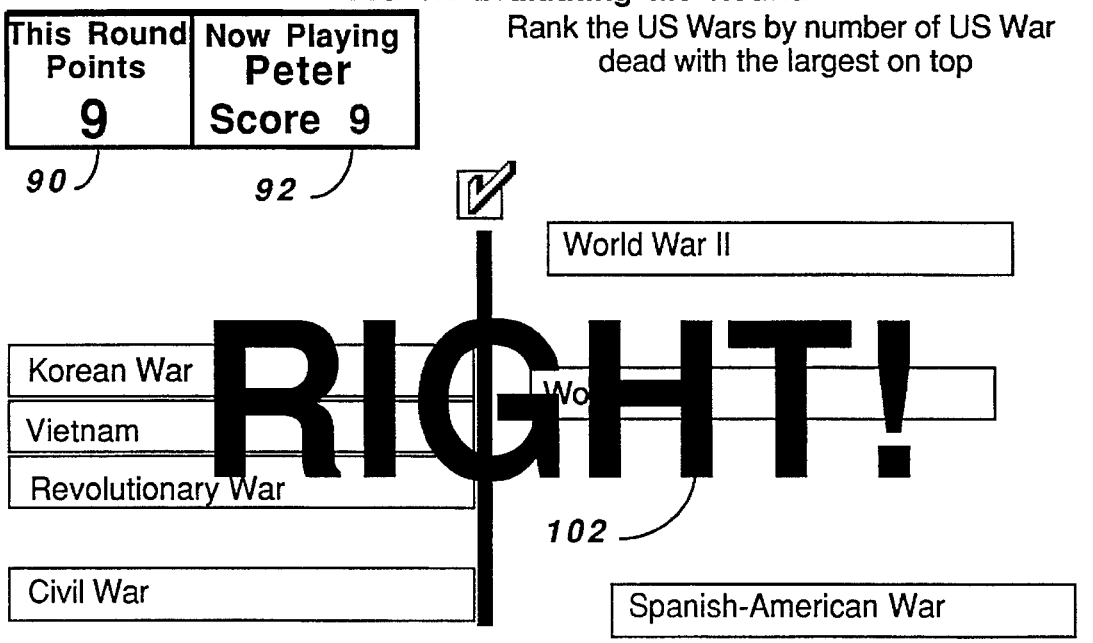
FIG 1H Evaluating the Round

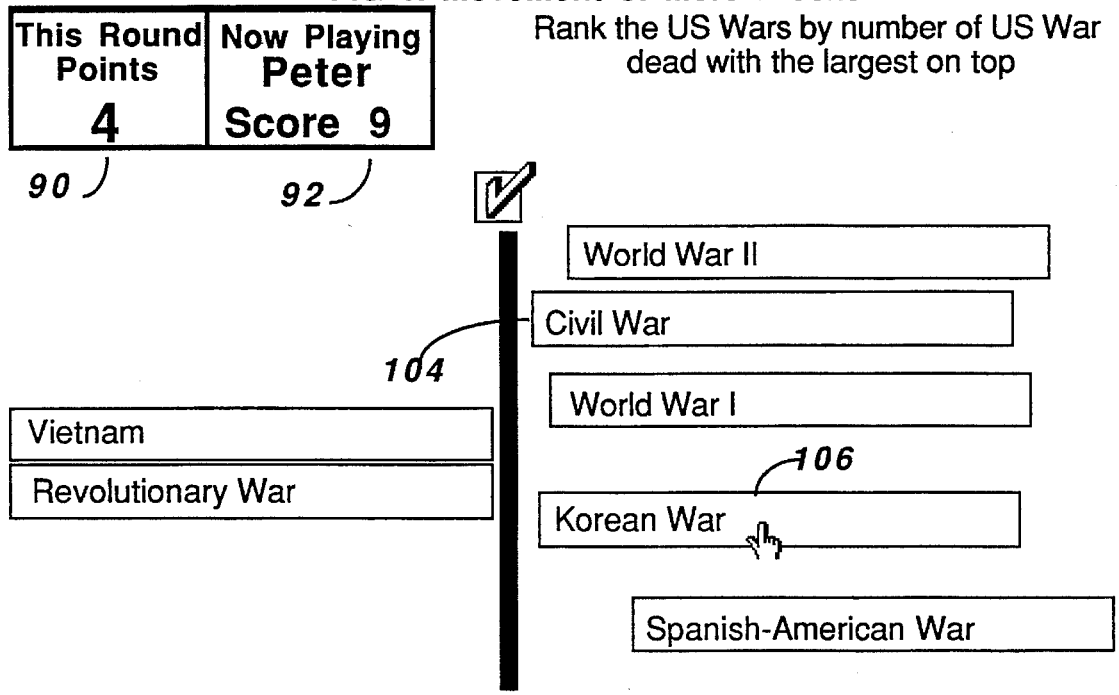
FIG 1I Movement of More Blocks
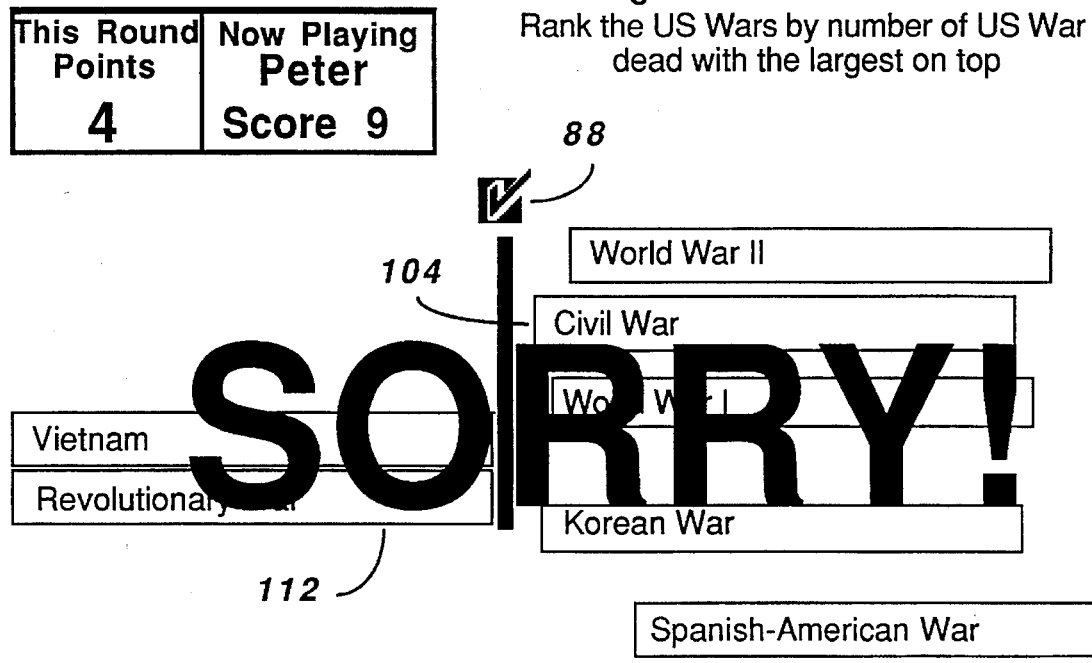
FIG 1J Evaluating the Round

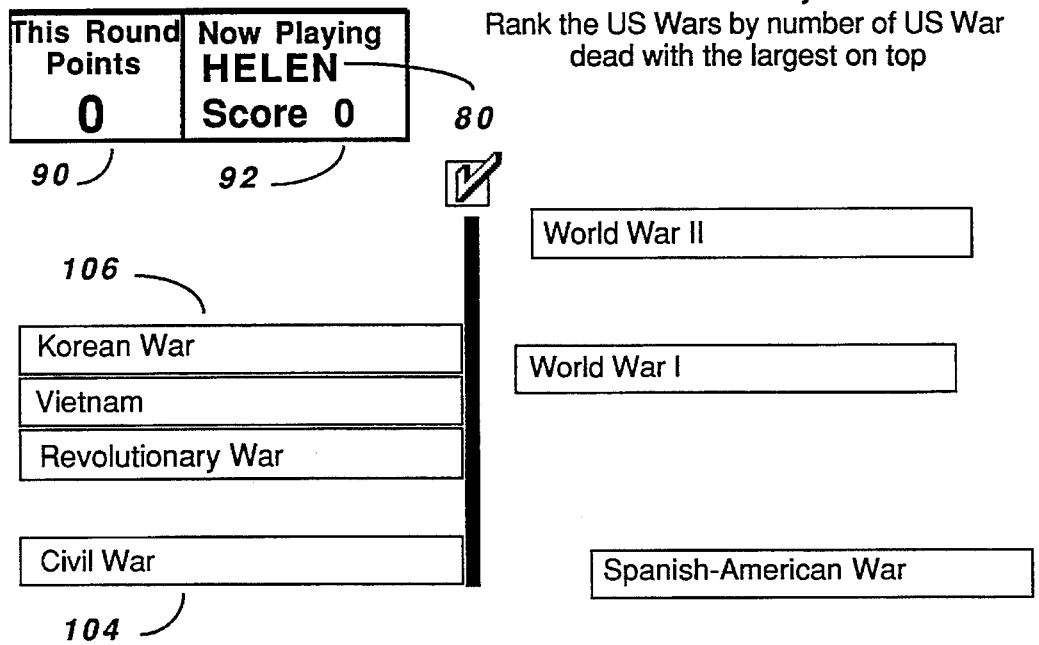
FIG 1K First Round for a New Player
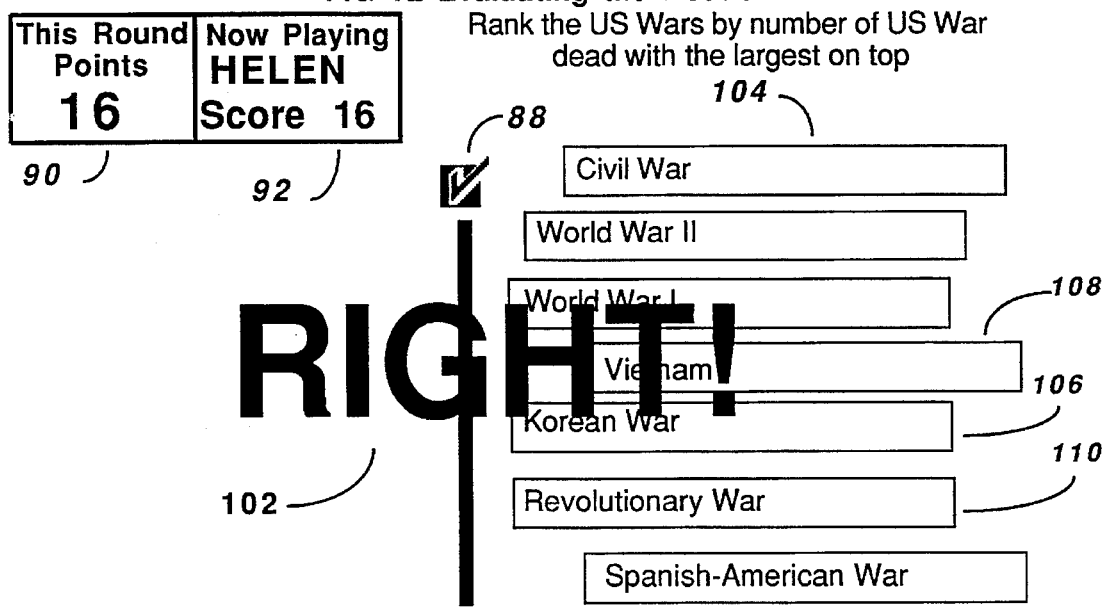
FIG 1L Evaluating the Round

FIG 1M A New Challenge

Place the lines to the Pledge of Allegiance in their proper order.

| This Round Points | Now Playing Helen |
|---|---|
| 0 | Score 16 |

90    92    80    82

| one Nation |
|---|
| under God |
| with Liberty and Justice |
| indivisible |
| and to the Republic |
| for all |
| for which it stands |
| of the United States of America |
| I pledge allegiance to the Flag |

84

FIG 1N A Third Example

Rank the following official US measurements with the largest on top.

| This Round Points | Now Playing Robert |
|---|---|
| 0 | Score 56 |

| A bushel-struck |
|---|
| A cup |
| A tablespoon |
| A pint |
| An ounce |
| A gallon (Imperial) |
| A teaspoon |
| A gallon (US) |
| A peck |

FIG 1O Different Approach to Old Material

| This Round Points | Now Playing Sheila |
|---|---|
| 0 | Score 32 |

Put the following US Wars in the order of occurrence with the most recent on top.

| Mexican War |
| Spanish-American War |
| World War I |
| Korean War |
| Vietnam |
| Revolutionary War |
| World War II |
| Civil War |
| War of 1812 |

FIG 1P Different Approach to Old Material

| This Round Points | Now Playing Sheila |
|---|---|
| 0 | Score 32 |

Place the historical events in their proper order with the most recent on top

| Cuban missle crisis |
| Declaration of Independence |
| Boy Scouts of America founded |
| Boulder Dam completed |
| Battle of the Alamo |
| U S bombs Tripoli |
| Horatio Alger published first book |
| Nixon resigned |
| Rosenbergs executed |

FIG 1Q Example of Satistical Material

Rank the following US Religious groups by number of members with the largest on top.

| This Round Points | Now Playing Chuck |
|---|---|
| 0 | Score 157 |

- Jewish
- Buddist
- Eastern Churches
- Protestant (All)
- Roman Catholic
- Catholic (Non Roman)

FIG 2A First Round of Grouping Play

Place the Presidential and Vice Presidential candidates in their proper party.

| This Round Points | Now Playing Peter |
|---|---|
| 0 | Score 0 |

Dewey
Humphey
Mondale
Ford
Reagan
Wilson
Carter
Williams J. Bryan
Collidge
Agnew
Roosevelt-T
Stevenson
Alfred Smith
Alfred Landon
Rockefeller

121

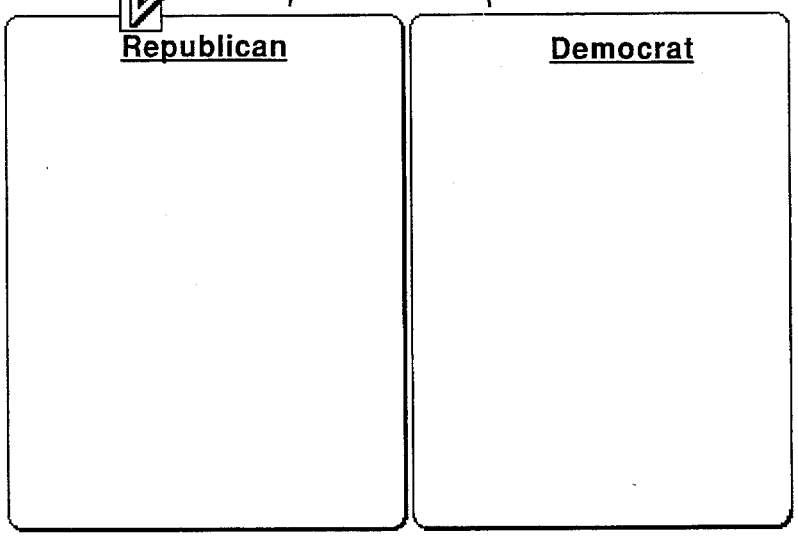

Republican    Democrat 82
120

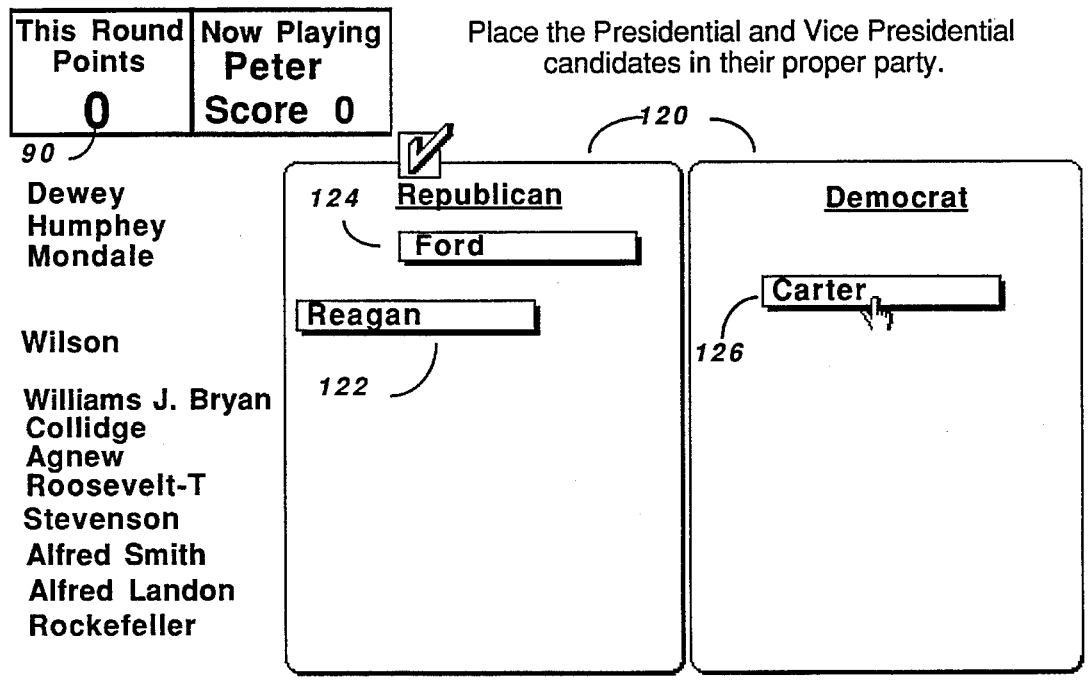
FIG 2B Placement of Blocks
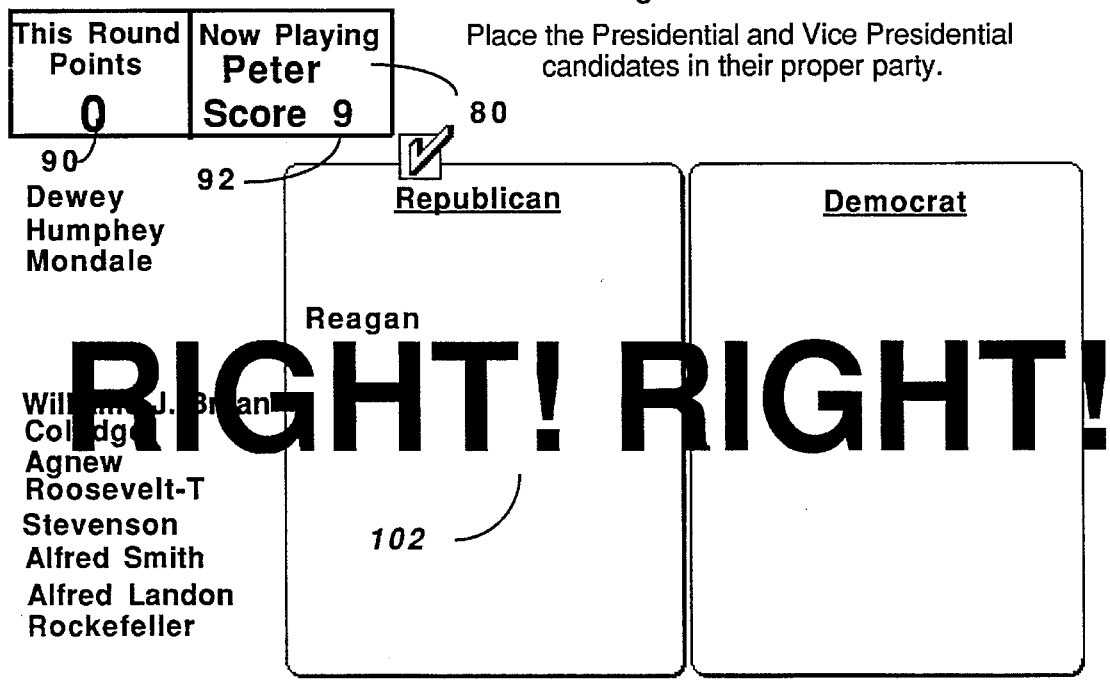
FIG 2C Evaluating the Placement

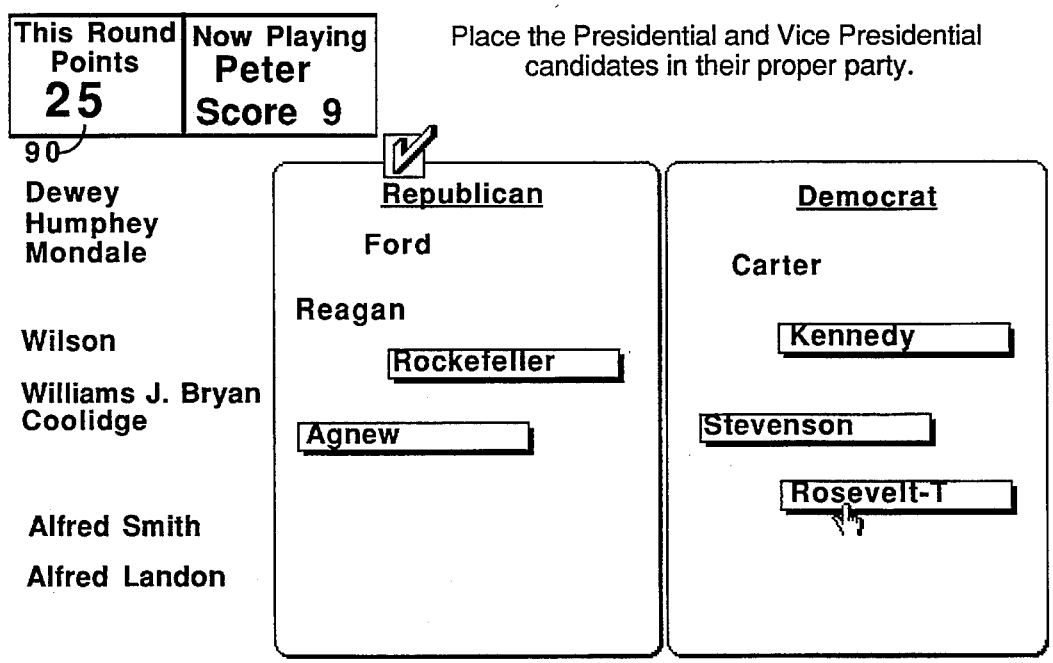
FIG 2D Movement of More Blocks
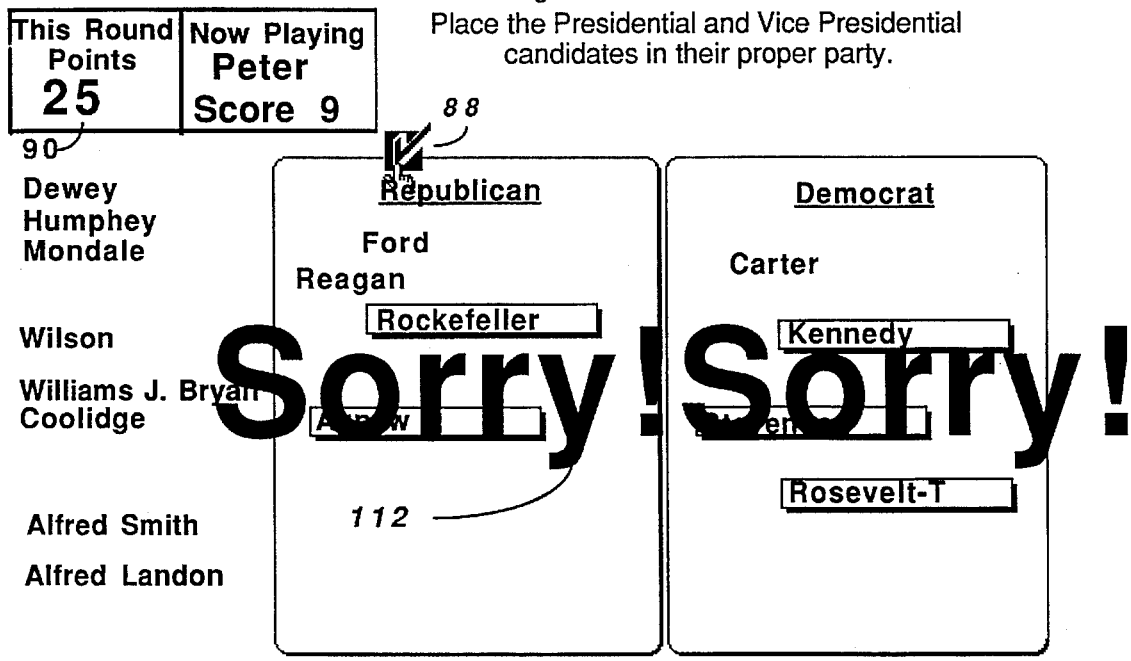
FIG 2E Evaluating the Placement

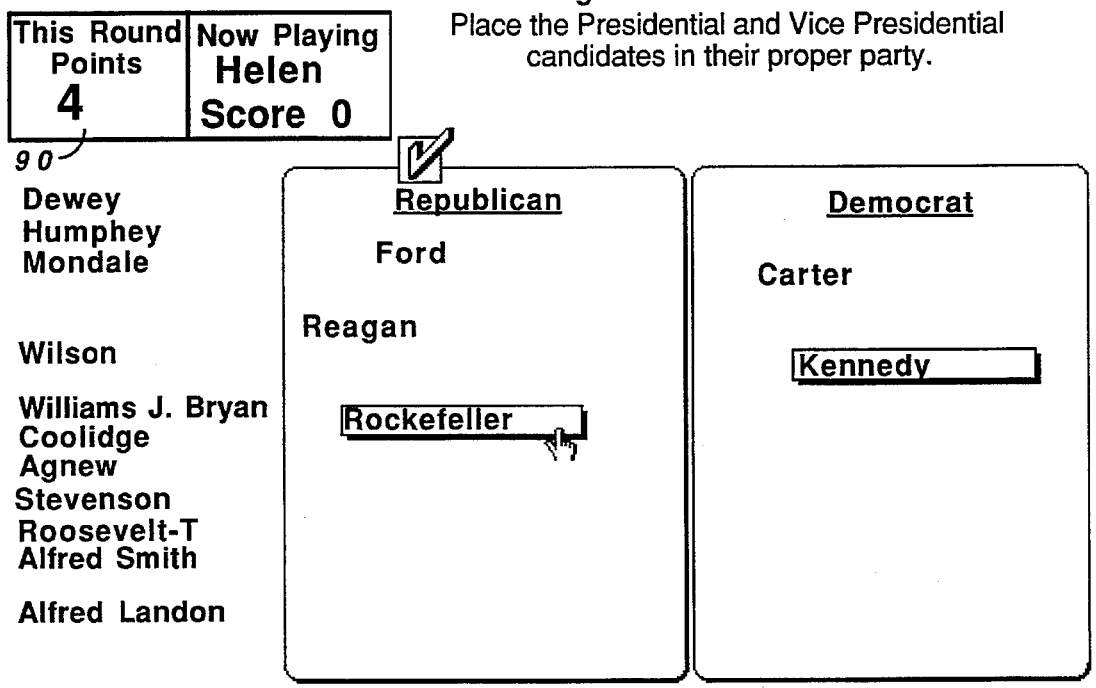
FIG 2F Moving More Blocks
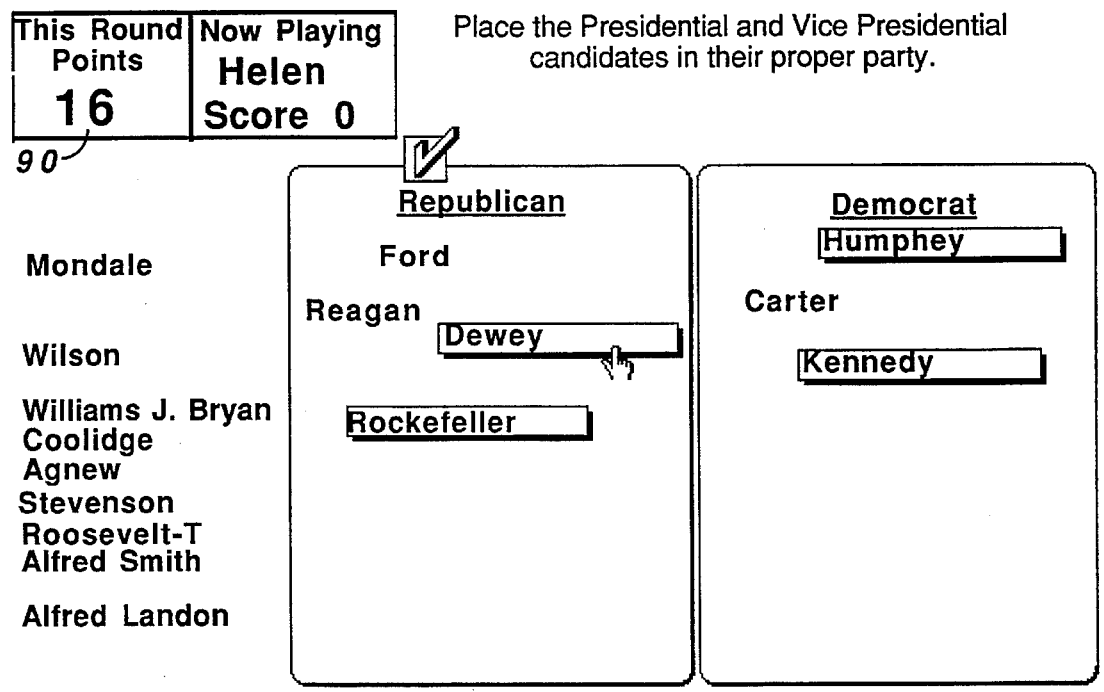
FIG 2G Moving Still More Blocks

FIG 2H A New Challenge

| This Round Points | Now Playing |
|---|---|
| 9 | Helen Score 16 |

Place the New World explorers by country they worked for.

Ponce de Leon
Coronado
Henry Hudson

John Cabot
Amerigo Vespucci

Magellan

Verrazano
Hernanfo Cortez
Henando De Soto

Robert Lasalle
Champlain
Leif Erickson

England
  Sir Frances Drake

France
  Marquett Joilet

Netherlands

Norway

Spain
  Columbus

FIG 2I Another Challenge

| This Round Points | Now Playing |
|---|---|
| 16 | Robert Score 123 |

Place the states by border. If a state has two borders -- the LONGER border is the correct one.

New Mexico
Oregon
Florida

New York

Texas
N. Carolina
Georgia
Michigan
Maine
Minnesota
Ohio
N. Dakota

W. Coast
  California

E. Coast

Great Lakes

Mexico
  Arizona

Canada
  Washington
  Idaho

Gulf Coast

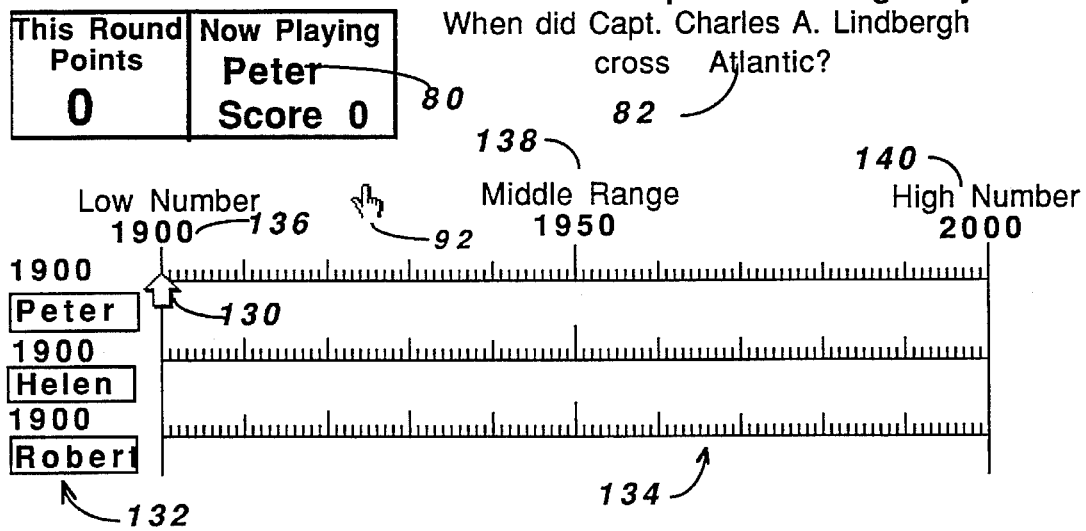
FIG 3A An Example of Scaling Play
When did Capt. Charles A. Lindbergh cross Atlantic?
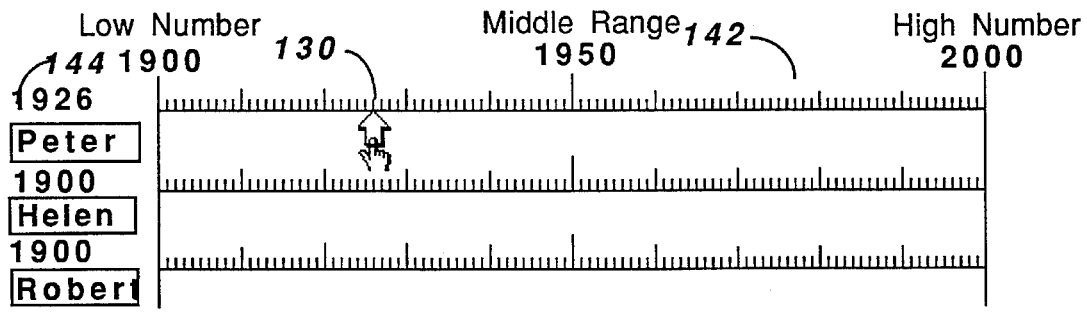
FIG 3B The Movement of the first Arrow
When did Capt. Charles A. Lindbergh cross Atlantic?

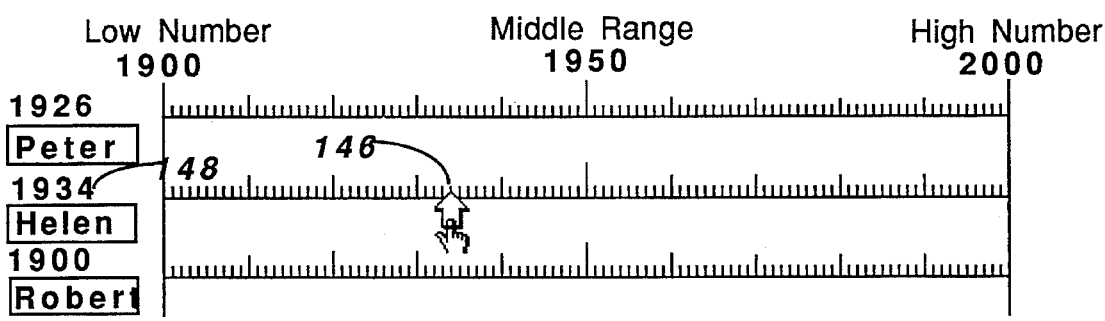
FIG 3C The Movement of the Second Arrow
When did Capt. Charles A. Lindbergh cross Atlantic?
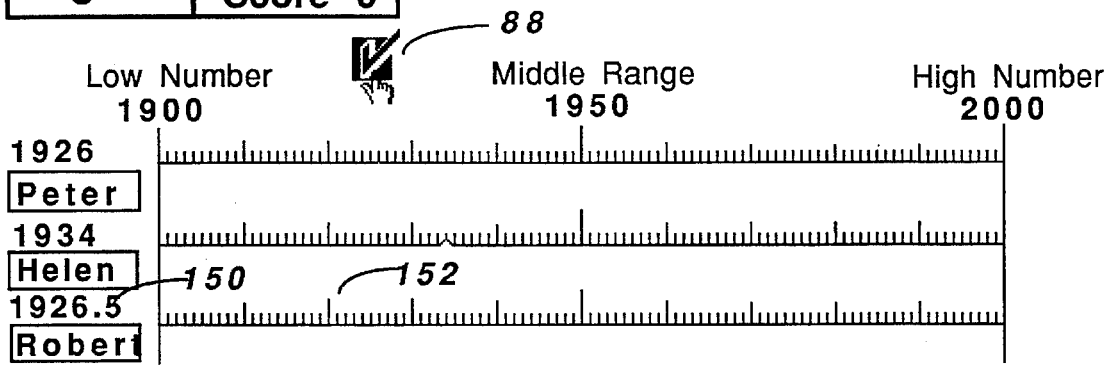
FIG 3D Pushing the "Check" Button
When did Capt. Charles A. Lindbergh cross Atlantic?

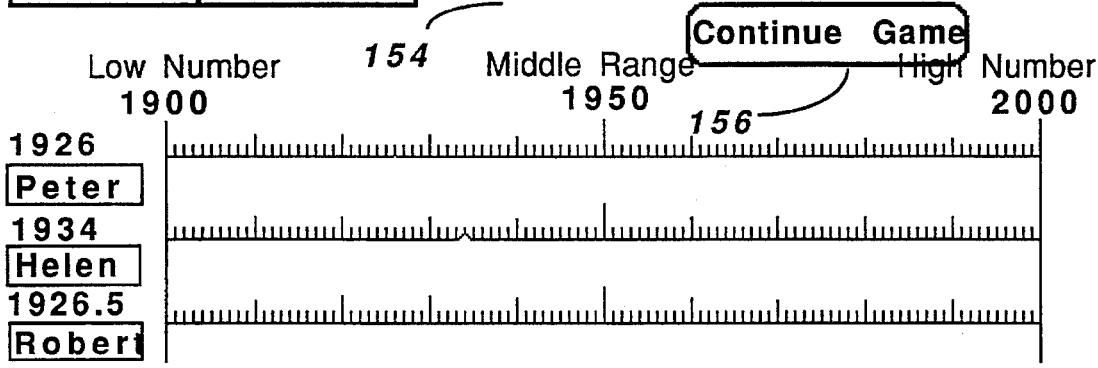
FIG 3E The Results of the Round
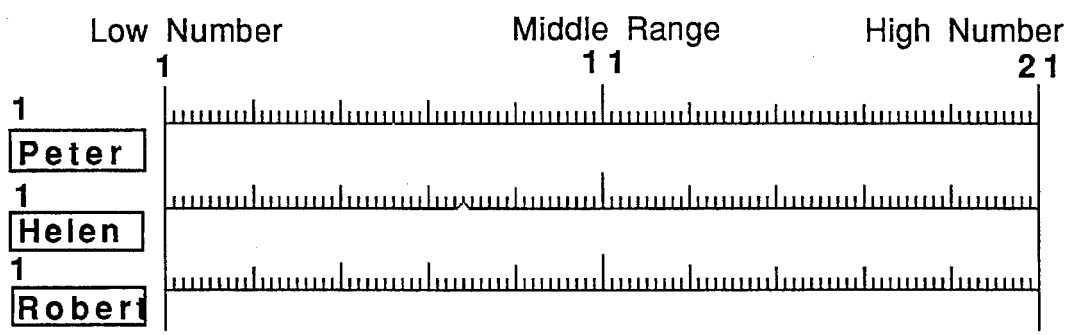
FIG 3F An Example of a Different Challenge

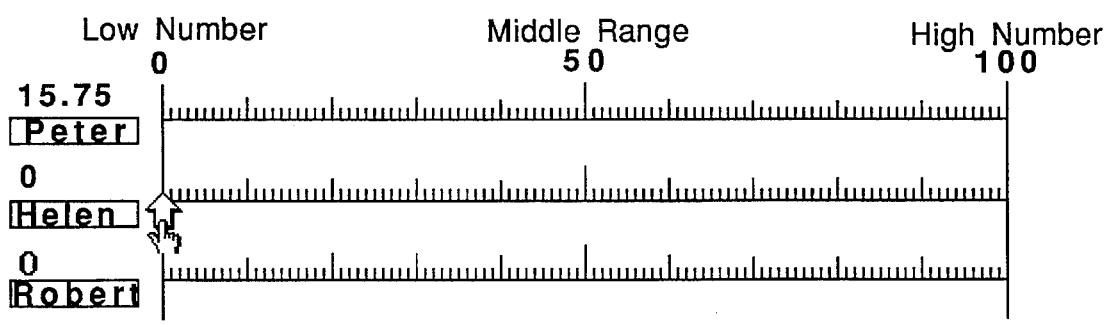
FIG 3G Another Example of Scaling Play

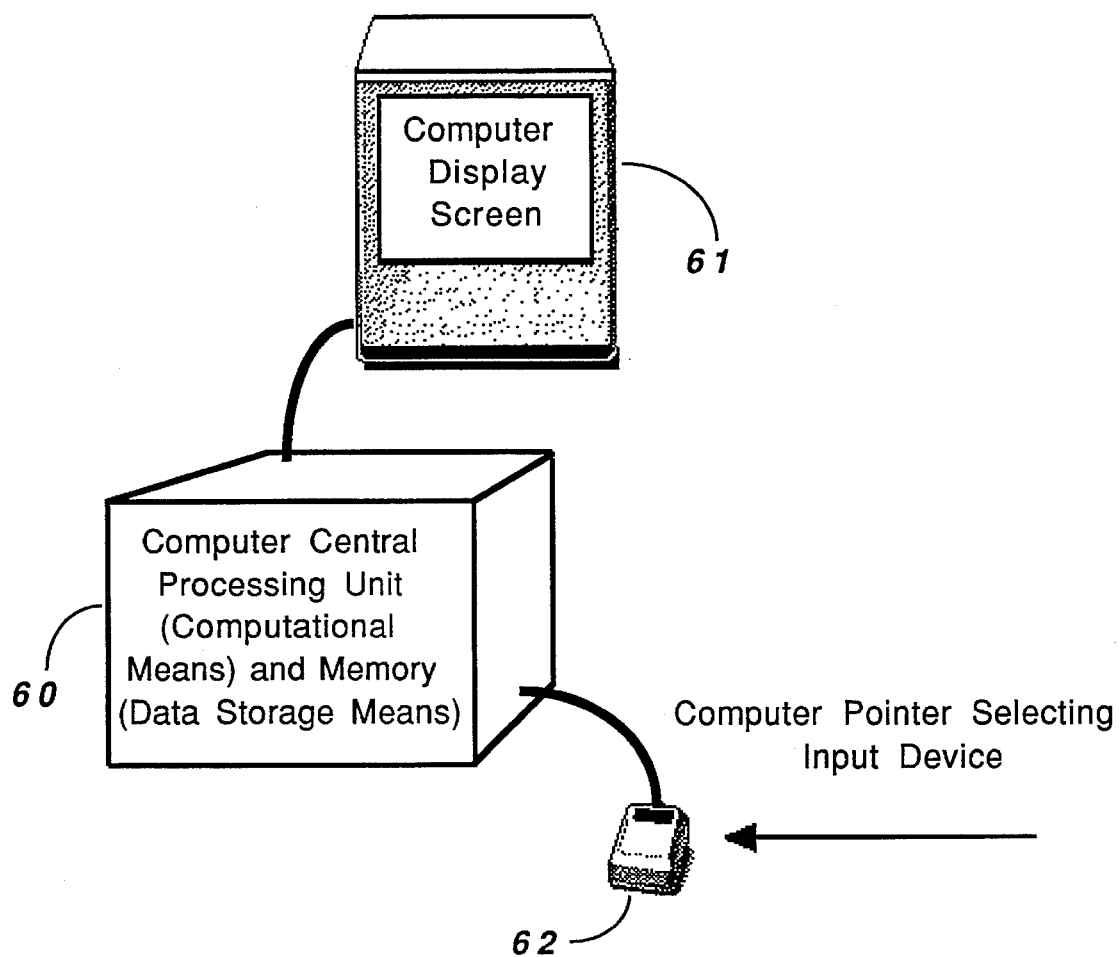
Fig 4  Layout of Invention

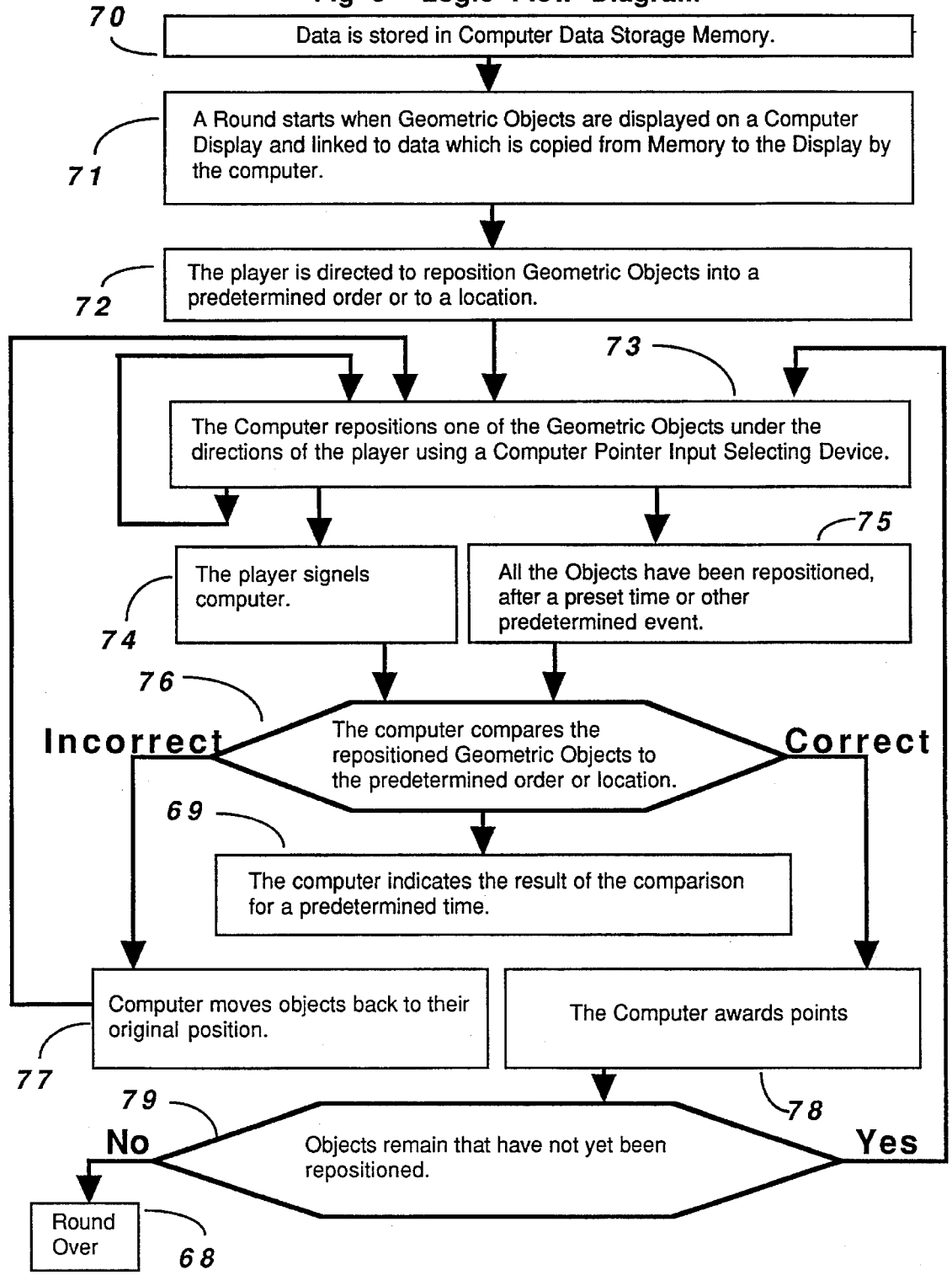

KNOWLEDGE TESTING COMPUTER GAME METHOD EMPLOYING THE REPOSITIONING OF SCREEN OBJECTS TO REPRESENT DATA RELATIONSHIPS

This is a continuation of Ser. No. 07/948,346, filed Sep. 21, 1992, abandoned, which is a continuation of Ser. No. 07/725,878, filed Jun. 28, 1991, abandoned, which is a continuation of Ser. No. 07/450,167, filed Dec. 13, 1989, abondoned.

BACKGROUND: FIELD OF INVENTION

This invention is a computer game, specifically, a game with a simple, intuitive means by which players may prove their understanding of factual material.

Background: Description of Prior Art

Games that test knowledge predate the computer or data processor and perhaps recorded history. In recent years, knowledge-testing games have been implemented using computers to present questions, enter answers and grade such answers. Heretofore such computer games can be divided into two major categories: Multiple Choice Games and Random Input Games.

Multiple Choice Games

Multiple Choice Games involve presenting a question on an output device, such as a video screen, and the listing of possible answers on the same output device. The player indicates a selection by either typing the letter or number of the selection, pressing a button representing the letter or number of the selection, or moving a screen pointer or cursor to the selection and pressing a button.

Advantages:

A multiple choice game is easier for an author or designer to program because the coding subroutine is simple and unambiguous. For example, assume the game requires the player to type in one of the four letters A, B, C, or D to represent one of four possible answers. The portion of the controlling program which implements this operation, termed a subroutine, is easy to write since it simply loops through the response four or less times, evaluating the user's response against the correct answer, ( A, B, C, or D).

Disadvantages:

1) Assuming the player knows the correct answer, he or she must still read and I() remember all, or most, of the listed answers before continuing. This adds to the tedium of the game.

2) Each question and list of answers takes up space on the screen and time to read. Because of this, it is difficult to list more then one set of questions and answers at a time. If a player were allowed to choose from several questions, they would choose the easier ones first, and then move on to the more difficult ones. They would, as a result, get more right answers. With only one question to answer, there are fewer right answers. This becomes a problem in dealing with people who have a low self image, including many students. Ideally, an educational game should make all the players feel good about playing, even if they aren't winning, by getting some questions correct and confirming what they know.

3) If there are multiple players, it is difficult to maintain the threshold of interest among all players because the question posed to one player is usually not then posed to the next player because of the limited number of answers. This causes the players who are waiting their turn not to read the material that is being presented to the other player and loose interest.

4) This type game reminds many players of the multiple choice questions in school and tends to diminish its appeal.

5) There is often a disassociation between the answers and the means to select the answers. For instance, if the answer is "Third Reich", the button or key to push might be "#2" or the letter "D". This lacks any mnemonic connection and thus requires an extra mental step.

Random Input Games

Random Input Games involve the computer program presenting a question on an output device, such as a video display, and requiring the player to type in the correct answer using a keyboard.

Advantage:

If the player knows the answer, all the player need do is type it in; there is no need to also read, relate to, and become familiar with a list or try to relate the list to a button or key. The question, if not answered correctly, may then be posed to the next player because the number of answers in unlimited.

Disadvantages:

1) The programming for any game that is interpreting keyboard input gets progressively more complex as the range of possible inputs increases. Even if the answer is simple, allowances must be made for different variations, misspellings, different spacings and typographical errors. For example, if the correct answer is "George Washington", the program must be written so that variations such as "G. Washington", "G washington", "President Washington", "President G. Washington", "Pres G. Washington", "General Washington", will be graded correctly. The greater the allowances, the greater the time needed by the program to check the answer. The more computer time, the slower the response time and the greater the chance that the players will loose interest. Such allowances also increase the computer memory required and the complexity of the job of creating question material for the game.

2) The answers must always be simple for the reasons stated in item 1. This limits the scope of the game to simple material.

3) The players must be willing to type. This all but eliminates multiple player games for several reasons:

A) Many people can't type.

B) There is a great reluctance of even good typists to type in front of others because of fear of making mistakes.

C) Many people are unsure spellers. Even if one can type, many would rather not exhibit their spelling in front of others. One can't scribble the answer the way one did when playing parlor games. The potential of making a fool of one's self in front of others is a very great disincentive to playing this kind of game.

D) If there is only one keyboard, either it must be moved between players or the players must move around in front of it. Moving a keyboard is much more difficult then moving a mouse or joystick. Moving players is tedious. Keyboards are much more expensive than joysticks. Although there are many game computers with multiple joysticks, few if any have multiple keyboards.

Any requirement to type reduces the potential player base and corresponding customer base for the same reason as outlined in item A above.

Thus the reader will see that both types of knowledge-testing computer games have serious disadvantages.

Objects and Advantages

Accordingly, several objects and advantages of my invention are to provide a knowledge testing and tutorial computer game in which:

1) A player does not have to read or even understand all the material before starting play;
2) A player is not limited to a single question, but may choose from a range of material;
3) Multiple players play with the same material;
4) There is no association with an unpleasant multiple choice test;
5) There is a direct, intuitive link between the answer and the means to select the answer;
6) The requirements for computer memory, power and programming complexity are minimal;
7) The input material need not be of a simple nature;
8) Typing is not necessary;

Other objects and advantages of my invention are to provide a game which maintains interest among the players who are awaiting their turn because all the players are playing with the same material, in which players are positively reinforced for what they know, yet there is reward for depth and breadth of knowledge, in which players are rewarded for good educated guesses, in which players may interact with the game using multiple joysticks or by circulating a computer mouse, in which conversation among the players is stimulated through a spatial display of ideas and concepts, and in which retention of educational material in increased through the excitement of playing a win-or-loose game. Further objects and advantages of my invention will become apparent from a consideration of the drawings, the ensuing description and by actually playing the game.

BRIEF DESCRIPTION OF DRAWINGS

FIG. 1A shows an opening screen for one version of a game of my invention in which players are challenged to rank blocks in their correct order.

FIGS. 1B to 1F shows a player moving blocks in such a game.

FIG. 1G shows how a player asks the program to evaluate a first round by pressing a "Check" button.

FIG. 1H shows results of the program evaluating the first round.

FIG. 1l shows the player placing two more blocks.

FIG. 1J shows the results of the program evaluating the placement of the two blocks.

FIG. 1K shows an opening screen for a second player.

FIG. 1L shows results of the program evaluating placement of blocks by the second players.

FIG. 1M shows an opening screen in which players are challenged to place verse in proper order.

FIG. 1N shows an opening screen in which players are challenged to place quantitative values in proper order.

FIG. 1O shows an opening screen in which players are challenged to place wars by date.

FIG. 1P shows an opening screen in which players are challenged to properly place historical events.

FIG. 1Q shows an opening screen involving statistical material.

FIG. 2A shows an opening screen of a second type of play in which players are challenged to place politicians by party.

FIG. 2B shows a placement of three small blocks in their respective large blocks.

FIG. 2C shows results of the program evaluating the recent placement of blocks.

FIG. 2D shows a placement of five more small blocks in their respective large block.

FIG. 2E shows results of the placement of the five small blocks.

FIG. 2F shows a second player placing two small blocks in their respective large block.

FIG. 2G shows the second player moving two more small blocks.

FIG. 2H shows a round of play in which players are challenged to place people into their proper country.

FIG. 2I shows a round of play involving states.

FIG. 3A shows an opening screen of a third type of play in which the players are challenged to move arrows along a scale to represent a historical event.

FIG. 3B shows a first player moving an arrow along a scale.

FIG. 3C shows a second player moving a second arrow along a second scale.

FIG. 3D shows a third player pressing a "Check" button after having moved a third arrow.

FIG. 3E shows results of the program evaluating the placement of the three arrows.

FIG. 3F shows a round of play in which players are challenged to move arrows in response to a question on world population.

FIG. 3G shows a round of play in which players are challenged to move arrows in response to a question on foreign aid and military assistance.

FIG. 4 shows the layout of the Invention.

FIG. 5 shows the logic flow of the Invention.

DESCRIPTION OF THE PREFERRED EMBODIMENTS

In FIG. 4 and 5 a computer knowledge-testing game in accordance with applicant's invention consists of a computer central processing unit (Computational Means), memory (Data Storage Means) 60, computer display screen 61 and mouse (Pointer Input Selecting Device) 62. In the preferred embodiment, factual data is stored in Computer Data Storage Memory 70. The Central Processing Unit copies the factual data from Data Storage Memory to the Computer Display Screen 71 and places it into (or otherwise associates it with) Geometric Objects on the Display Screen such as rectangles, arrows or blocks. These Geometric Objects are created by the computer on the display screen and may be of any shape, but will be referred to as blocks or arrows for simplicity. The factual data represents names, places, items, definitions, abstract ideas or concepts in a body of knowledge that have a natural relationship, order, grouping, proximity, or value based on definition or attributes.

There are three types of play in the program. In each type of play, the players are directed to move blocks on the screen using a computer pointer selecting input device 62 & 73, such as a mouse or joystick. Correct movement of the blocks results in points being awarded 78. I have designated the three types of play (1) "Ranking", (2) "Grouping", and (3) "Scaling" in order to aid in understanding the description that follows.

1) Ranking Play

Summary of a round of play (See Screen FIGS. 1A–1Q and Logic Flow FIG. 5)

In the first type of play, termed "Ranking" play, a screen (FIG. 1A through 1Q) is divided down the center into two areas. On the left side, rectangular screen blocks, consisting of areas on the screen bordered by lines, are positioned vertically, i.e., one over another. The right side of the screen is empty. Into these blocks are placed words and phrases representing factual material that is linked by the characteristics of association, magnitude, order, sequence, linear relationship, or hierarchy 71. Examples of this are lists of things that are earlier or later than each other such as historical events, higher or lower than each other such as the latitude of cities, bigger or smaller than each other such as the land area of states, etc.

The player is directed 72 to move blocks from the left side of the screen and place them in their proper order on the right based on a stated characteristic, such as magnitude. For example, the player might be challenged to rank historical events in their proper order of occurrence, or cities by size of population or latitude. The player selects and moves any block, in any order 73 & 94 using the computer mouse. The player may have the program evaluate the placement of the blocks at any time 74.

The purpose of moving the blocks is to accumulate award points. The number of points that may be awarded if the blocks are correctly repositioned is proportional to the square of the number of blocks repositioned. For example, if two blocks are repositioned, four points may be awarded, if three blocks are repositioned, nine points may be awarded, five blocks equal 25 points, etc.

When directed by the player to evaluate the placement of the blocks 74, after all the blocks have been repositioned, after a preset time or other predetermined event 75, the program then compares the order of the blocks against the correct order of the material in the blocks 76. If all the blocks are correctly repositioned 76 points are awarded to the player 78 and the player may continue moving more blocks 73 if there are blocks remaining on the left 79, otherwise the round is over 68. However, if any block is incorrectly repositioned 76, the player looses his or her turn and all of the blocks recently repositioned are returned to the left 77, the play continues to the next player and no points are awarded for the blocks recently repositioned, thus providing an award reflecting risk and capability.

The next several Figures show screen printouts of Ranking play along with an explanation of what is happening.

Example of several rounds of Ranking play (FIG. 1A–1Q, 5)

FIG. 1A shows a computer screen (borders omitted for facilitation of illustration) in which text 82 at the top of the screen challenges a player whose name 80 is already inserted on the screen in a box at the top to "Rank the US wars by number of US War dead with the largest number on top 72". There are seven rectangular blocks 84 stacked in random order on the left. Text 86 has been placed into these blocks representing wars in which the US has participated.

The screen contains a small box 88 containing a checkmark. This box will be referred to as a "button". The player can "push" button 88 by moving a cursor on the screen (not shown) to a position over the button and pushing a key. Usually the player moves the cursor by using a mouse or joystick (not shown) and pushes a key on the mouse or joystick to activate button 88.

A mouse is a computer hardware input device about the size of a paperweight that sits on a flat surface such as a desk or table. It is attached to the computer by wire and can be moved in any direction on the surface using the palm and fingers of a person's hand. A rollerball on the bottom of the mouse translates its movements into signals that are sent to the computer. The computer moves a cursor on the screen in synchronization with the movement of the mouse on the flat surface. A button on the mouse can be pressed to indicate the pressing of a finger or button on the screen. To move a screen block, for example, the player places the cursor over the block to be moved and presses and holds down the mouse button. When the player moves the mouse in any direction the screen block is moved in the same direction. When the player lets up on the mouse button, the screen block stops moving.

A joystick resembles the single handle controls of a fighter aircraft. Movement of the stick around its axis moves the cursor on the screen. The firing button on the top of the joystick performs the same function as the mouse button.

The player pushes button 88 when he or she has finished moving blocks and wants the program to evaluate their placement.

There are two scores 90 and 92 indicated in the boxes at the top of the screen: a potential score 90 informs the player of the potential points that will be awarded if the blocks are correctly placed, and a player's score 92 informs the player of the total score to this time.

FIG. 1B shows an image of a hand 96. The hand represents a cursor which is controlled by the mouse or joystick. In FIG. 1B a player moves a block 94 from the stack of blocks 84 on the left to the playing area on the right. A potential score 90 for correct placement is 1, the number of blocks squared. FIG. 1C shows the final placement of block 94 near the bottom of the playing area.

FIG. 1D shows the player starting to move a second block 98 which is completed in FIG. 1E, raising the potential score 90 to 4, (i.e., 2 squared). The potential score 90 increases to 9 in FIG. 1F with the placement of block 100.

FIG. 1G shows the user directing the program to evaluate the placement of the three recently placed geometric blocks by pushing "Check" button 88 with the hand cursor 96. The program has evaluated the placement of the three blocks and notifies the player that the order of placement was correct in FIG. 1H. It has done this with a sound and the temporary overlaying of the screen area with the word 102 "RIGHT!" The player's score 92 is increased to 9 and the potential score 90 is reset to 0.

FIG. 1I shows the first two blocks 104 and 106 to be placed in a second round. Player's score 92 stands at 9, and potential score 90 for the second round is 4, (i.e., 2 squared). In FIG. 1J the player just pressed "Check" button 88. Inasmuch as block 104 with "Civil War" in it is incorrectly placed, the player is being informed by the program that at least one item is not in the proper order with a screen overlay of a word 112 "SORRY!" and a beep.

FIG. 1K shows a start of a first round for a second player 80. Two blocks 104 and 106 moved during the second round of the first player have been returned to their original positions and potential score 90 has been reset to 0. The second player is starting with score 92 of zero. Note: even though block 106 with the material "Korean War" in it, was correctly placed, the "all or nothing" strategy of the game returns it to the random stack of blocks for the next player to place.

FIG. 1L shows the results of the second player having placed the remaining four blocks 104, 106, 108, and 110 correctly and pressing "Check" button 88. The player has been notified of the correct placement with an overlay word 102 "RIGHT!", and has been awarded a potential score 90 of 16 (i.e., 4 squared). Player's score 92 has been increased to 16.

FIG. 1M shows the continuation of the play by the second player 80 who has a score of 16 points. There is text 82 of a new challenge at the top of the screen to "Place the lines of the Pledge of Allegiance in their proper order". There are nine blocks 84 and in the blocks are the words to the Pledge of Allegiance.

FIGS. 1N, 1P and 1Q shows an example of other subject areas the program can address.

FIG. 1O is actually the same factual material from the first example, but with a different challenge based on different characteristics.

Appendix B contains a printout of part of an input text file for Ranking play. The factual material consists of lists arranged in correct order and is easy to create and check. I have provided a listing with factual material from the example shown in the drawings. The material deals with the people, places, and history of the U.S. However, one of the advantages of my invention is that it can test a broad range of material. For example, the authors of the test material for the game can place the days of the week or months of the year in the blocks, making a game for small children. By translating the text in the blocks into French, it becomes a high school game. By using several different languages, it becomes a parlor game. By putting the names of the parts of the digestive tract into the blocks, it becomes a tutorial for biology or medical school. By placing electrons, protons, and quarks in the blocks, one can learn particle physics. By using famous movies, movie stars, or TV shows, it becomes a Hollywood trivia game.

2) Grouping Play

Summary of a round of play (See Screen FIGS. 2A–2I and Logic Flow FIG. 5)

In a second type of play, termed Grouping play, there are two types of blocks: Large Blocks 120 and Smafi Blocks 121. Factual material which is linked by characteristics, such as association, organization, classification, possession, attachment or grouping such as lists of politicians or political parties, is placed in both types of blocks 71. The small movable blocks are stacked on the left (FIG. 2A). The large unmovable blocks are placed next to each other and cover the remaining right portion of the screen. The player is directed to reposition the small blocks into the appropriate large blocks based on organization, relationship, classification, possession, attachment, or grouping 72 & 82. The play of the round then proceeds the same as in Ranking play, previously described.

Example of several rounds of Grouping play (FIGS. 2A–2I, 5)

FIG. 2A–2G shows a computer screen in which players have been challenged to "Place Presidential and Vice Presidential candidates in their proper party". The challenge is stated in text 82 at the top of the screen. A stack of small blocks 121 with the names of Presidential and Vice Presidential candidates in them fill the left side of the screen and two large blocks 120 with the names "Republican" in one and "Democrat" in the other fill the right. The outlines of the small blocks on the left have been omitted in order to allow more room for the text inside.

FIG. 2B shows an example of three recently moved small blocks 122, 124, and 126 into two large blocks 120. Just as in Ranking play, score 90 is now 9 (i.e., 3 squared).

In FIG. 2C the computer is informing player 80 that the recently moved blocks were correct by overlaying words 102 "RIGHT! RIGHT!" on the screen and putting nine points in player's score 92. Potential score 90 has been reset to 0. The player places five more small blocks into the two large blocks in FIG. 2D, increasing potential score 90 to 25.

In FIG. 2E the player has pushed "Check" button 88. The program is informing the player with an overlay of words 112 "Sorry! Sorry!" that at least one of the five small blocks was incorrectly placed and it is about to move them back to the area on the left.

FIG. 2F shows the next step of the game in which the five small blocks have been returned to the left because at least one of them was incorrectly placed. The next player has already moved two small blocks into the large blocks. Potential score 90 is now 4, but climbs to 16 in FIG. 2G when two more small blocks are moved into the large blocks.

FIG. 2H and 2I show other example of Grouping Play.

Appendix B includes a printout of part of an input text file for Grouping play. Just as in Ranking play, the text consists of simple ASCII records with fields separated by commas. Anyone with a personal computer can easily create input material for this game using most standard word processing, database, or spreadsheet programs, because it is simple and easy to check and edit.

As mentioned in Ranking play, the examples cover the people, places, and history of the US. But there is a tremendous amount of other material that can be used. For example, if the parts of the human body are made the small blocks and the major biological systems the larger blocks, a game can be made to teach high school biology. Also movie stars can be grouped with their movies, sports figures with their sports, or products with their manufacturer. A game can be made to place everyday objects in their proper grouping, thereby providing a game for students taking English as a second language. By translating the names of objects into Latin, this language can be taught in an enjoyable manner.

3) Scaling Play

Summary of a round of play (See Screen FIGS. 3A–3G and Logic Flow FIG. 5)

In a third type of play, each player is assigned a single arrow-shaped block 130, Logic 388 Flow step 71, which may be moved along an assigned scale of values 134. The players are asked a question that requires a quantitative answer such as: "How many U.S Congressman are allowed by law?" or "How old must a person be to become President?, See Logic Flow step 72". Each player must then reposition the assigned arrow as close as possible to the correct answer along the assigned scale using the computer mouse. After all players have completed the movement of their arrows 130 & 146, Logic Flow step 75, the program compares the proximity of the placement of the arrows to the correct placement 76.

Points are awarded 78 as a function of how much closer the closest player's block is to the correct placement than the average of the other player's blocks are to the correct placement which completes a round of play.

Examples of a round of Scaling play (FIGS. 3A–3G)

FIG. 3A–3E shows an example of a Scaling play screen. The program has presented text 82 representing a challenge to guess the "Date that Lindbergh crossed the Atlantic". There are three players represented by three sets of names 132 and three scales 134. An arrow 130 of the first player is visible. The three sets of scales have a low value 136, a middle value 138, and high value 140 of "1900", "1950", and "2000", respectively. Hand cursor 92 is ready to be used FIG. 3B shows a first player moving first arrow 130 along a first scale 142. The number "1926" has registered in a digital readout area 144 on the left. This is repeated by the second player in FIG. 3C with a second arrow 146 being moved along the second scale to register the number "1934" in a second digital readout area 148.

In FIG. 3D the third player is pushing "Check" button 88 after having registered "1926.5" as a number 150 on a third scale 152.

FIG. 3lE shows results of the program evaluating the placement of the three arrow. The question is replaced by text 154 giving an answer, reference material, a statement of who was closest and how many points were awarded. The winner has been awarded 48 points. The player is about to push a "Continue Game" button 156 which will present the players with a new question.

FIGS. 3F and 3G show examples of other questions.

Appendix B includes a text printout of an input file for Scaling play. There is a question on each line consisting of fields separated by commas. The question is followed by a reference, the correct answer and a high and low value to correctly position the scale. As stated in the discussion of Ranking play, anyone with a personal computer and a word processing, database, or spreadsheet applications program can create material for this game.

Like the other two types of play, this type of play can also handle factual material from many different fields. For example, in the field of science, a suitable question would be "How many miles from the earth to the sun?", or "How many planets are there?". In biology it can be "How many ribs does a human have?". For children it could be "How many days are there in a week?" As in the other types of play, the factual material is contained in text files independent of programing of the game and can be in any language.

Computer Source Code and Input Data

Source code of a program for implementing the computer game of my invention is in a scripting language called HYPERTALK by APPLE COMPUTER Inc, Cupertino, Calif. for use on a MACINTOSH™ Computer. HYPERTALK language runs on an applications program sold under the trademark HYPERCARD™. HYPERCARD™ is an object oriented programing application and the code is attached to or associated with the objects created by the programmer. HYPERTALK™, APPLE COMPUTER™ and MACINTOSH™ are trademarks of APPLE COMPUTER™ of Cupertino, Calif.

Appendix A is a hard copy source code listing from the game program in the example. The listing also includes code for testing and checking the program, code that allows the user to browse the screen without playing a game, code for a tutorial, as well as code for parts of the game that are not shows in the example.

Since the HYPERTALK language is very much like ordinary English, it is easy to follow by anyone familiar with it. However, to aid in better understanding the code, I have listed some of the more important objects, variables and handlers that pertain to the three types of play used in the example. This is not an all inclusive list and doesn't, for instance, include local variables such as "TMP" (well known temporary holder of data) or "CNT" (well known counting variable). This will pose no problem, however, for anyone experienced in writing or reading the HYPERTALK language.

The game is not limited to the MACINTOSH computer and can also be played on an IBM COMPUTER, computers which are compatible with IBM computers, ATARI COMPUTER, APPLE COMPUTER, video arcade computers etc.

Appendix B shows the input data records for each type of play used in the examples. Each type of play has a different data record configuration. Each record is terminated with an ASCII "Return" character and each field is terminated by a comma. The first field of each record consists of one character of text which is used by the program to specify what to do with the remainder of the record. The remaining fields are loaded by the program into the various parts of the game.

The data records are in simple ASCII text and can be created by any text editor, database, word processor, or spreadsheet applications program on any type of computer.

Conclusion, Ramifications, and Scope of Invention

The reader can see that my invention provides a simple and intuitive method of testing one's knowledge using a computer. The material that can be tested is not limited to any specific subject area or grade level. The material can be easily created by anyone with a computer. By completely eliminating the need for a keyboard, I have increased the potential player base. By using a pointing device to move the blocks, I have increased the type of computer, arcade game or bar room game machine it can run on and I have made the play of the game intuitive.

While my above description shows a specific example of an embodiment of my invention dealing with the history and people of the United States, my invention is not limited to games involving the USA. As stated, any factual material which can be linked by association, organization, classification, possession, attachment or grouping can be used in Grouping type play. Any factual material that can be linked by sequence, linear relationship, relationship, magnitude, order, or hierarchy can be used in Ranking type play. Any factual material that can be represented by a quantitative value can be used in Scaling type play.

For example, it can be used to teach small children how to count and read. It can be used by businesses to train employees about a product line, options package or company organization. It can be used as an entertainment game. It is not limited to a game format. It can be used as a means of machine testing students or job applicants. Because of the elimination of the keyboard, it opens up a whole new area of educational testing.

My invention is not limited to games involving text. Other symbols, such as chemical elements, scientific formulas, company decals, or icons (such as highway signs) can be used as blocks. Images and pictures, such as outlines of states, common household items, or famous people or monuments can also be used as blocks.

The placements of the blocks in Ranking play do not have to be above and below each other. They can be to the right and left, or in front of or behind each other. The initial placement of the blocks in Ranking and Grouping play do not have to be on the left of the screen. They can be on the right, top, or bottom. The blocks can even be on a separate screen or window that can be toggled or scrolled into view. The blocks or the text in the blocks do not have to be completely shown, they can be partially shown in scrollable or multipage fields, or shown as the game progressed.

The scales in Scaling play do not have to be linear numbers. They can be any set of scaling items, such as a log scale, colors, letters, such as the letters from "A to Z", words, such as "Very Hard, Hard, Soft, Very Soft", other symbols such as engineering symbols for type of soil, or icons, such as military tactical icons. The shape of the scale is not limited to a straight line, but can be round like a clock, angular like a wedge, or even be a circle in which small blocks are moved in and out from the center, or for which the diameter changes. The scaling blocks are not limited to arrows, but can be anything that designates position, such as clock hands, tokens, or other geometric objects. A variation of the game can give larger, less precise, blocks to weaker players, thereby giving them a broader window of correct placements.

The shapes of the blocks are not limited to rectangles, but can be any other geometric figure such as a circle, square, triangle, trapezoids, etc. A variation of the game can ascribe different values to different type of blocks, or blocks with different borders, colors, or type fonts.

The game is not limited to two-dimensional displays. In a three-dimensional display, blocks can be placed in front of, on top of, and behind other blocks.

Sound effects were mentioned briefly in the example and can be heard when the game is played. The game is not limited to the sound effects presently installed with the game. A variation of the game can be the addition of a computerized voice that repeats the text in the rectangles for the seeing impaired, or the addition of musical tones to indicate movement of blocks along a scale.

The example shows a display of the score and name in the upper left corner. Other means of giving the players this information can be used such as a pull down menu or dialog boxes.

The game is not limited to the point award structure I have shown in the example. Variations of the award structure can give handicaps for higher education level, age, or previous good performance. Variations of the programming code can monitor the performance of the players and choose material that tends to equalize the game, such as picking material not well known by the leading player. For example the leading player can excel in "State Capitals", but not "Sports Teams". The programing code can detect this and pick Sports Teams more often then State Capitols. Or the game can allow a younger player more turns, or a larger point factor than an older player.

The display of the game is not limited to computer screens. It can be projected on a large screen and used in competition between large groups, such as classes or schools. The game is not limited to black and white. A color version can ascribe different colors to different players, blocks, or type of material. A coin-operated machine with the game can be placed in a bar, restaurant, or waiting room. Multiple players can play the game remotely over a phone or other communications line. The pointing device is not limited to a mouse or joystick but can be played with any other pointing device, such as a touchscreen or trackball.

Accordingly, the scope of the invention should be determined not by the examples I have shown, but by the appended claims and their legal equivalents.

APPENDIX A

Source Code:

| Name | Type | Comment |
| --- | --- | --- |
| The USA Edition | Stack | Contains code used by multiple cards |
| SCRFLD | Field | Where the player's score is displayed |
| PTS | Field | Where the round score is kept |
| NP | Field | The player's name |
| H1 | Field | The question or challenge |
| HELP | Field | Part of instructions (Not shown) |
| PA | Field | Contains right answers (Not shown) |
| STATUS | Field | Contains data about the card (Never shown) |
| Notice | Field | A notice field (not shown in the example) |
| DEMODATA | Field | Contains data for demo (Not shown) |
| PEAK | Field | Part of Demo mode |
| DATA | Var | The factual material |
| QV | Var | A factor used in scoring |
| FAC | Var | A factor used in scoring |
| SCORE | Var | The score |
| SCR | Var | The score |
| OLDSCORE | Var | The old score |
| RSN | Var | The reason for getting a round wrong |
| STDRND | Var | The number of plays in a round |
| PLST | Var | Contains the player names and running score |
| PNBR | Var | The number of the current player |
| NXPNBR | Var | The next player |
| CLST | Var | Contains names and data for each card |
| CNBR | Var | The card number |
| MP | Var | The maximum number of players playing |
| RNBR | Var | The round number of the play |
| MA | Var | The maximum number of rectangles on the screen |
| MAXCD | Var | Maximum number of cards in the game |

APPENDIX A-continued

Source Code:

| Name | Type | Comment |
|---|---|---|
| GAME | Var | Indication of Game mode |
| BROWSE | Var | Indication of Browse mode (not shown) |
| TUTOR | Var | Indication of Tutor mode (not Shown) |
| TU | Var | Time when round is over |
| TL | Var | Time Left in play |
| LPTR | Var | A line Pointer to the data |
| SLPTR | Var | Staring line pointer |
| sA | Handler | Shows the answers (not shown in example) |
| sn | Handler | Shows NOTICE field (not shown in example) |
| cloNot | handler | Hides the NOTICE field |
| gNf | Handler | Gets a new file of data |
| rSss | Handler | Resets the starting screen |
| rScr | Handler | Resets the score |
| cT | Handler | Check the time |
| gItr | Handler | Got it right |
| gITw | Handler | Got it wrong |
| tO | Handler | Time out for new material |
| sT | Handler | Start the timer |
| fW | Handler | Flash the word Wrong |
| fR | Handler | Flash the word Right |
| fT | Handler | Flash the word Time |
| pS | Handler | Post the score to the player |
| CP | Handler | Changes player names |
| sUs | Handler | Sets up the screen prior to play |
| nR | Handler | Updates the screen between rounds |
| RNK | Card | The Ranking Example |
| #1–9 | Fields | The rectangles that are moved in Ranking |
| gQ | Handler | Brings data into the game |
| gNf | Handler | Get/open another file of data |
| rndmze( ) | Function | Mixes up the lines in a list |
| mMe | Handler | Moves the rectangles |
| TARGLST | Var | Contains the correct ordering of rectangles |
| Check Sel... But.. | Button | Evaluates the placement of objects |
|   on mouseUp | Handler | Checks the order of the rectangles for Button |
| LST | Var | The moved order of rectangles |
| CAT | Card | The Grouping example |
| #1–9 | Button | The large rectangles |
| #1–16 | Fields | The small rectangles |
| #17–26 | Fields | The text areas in the large rectangles |
| gQ | Handler | Brings data into card |
| CHARR | Var | Number of characters in a rectangle |
| TRGNBR | Var | Number of the small rectangle moved |
| CATLST | Var | The correct ordering of the small rectangles |
| GRPCAT | Var | The group category |
| CATCNT | Var | The number of large rectangles |
| GRPCNT | Var | The number of small rectangles |
| MC | Var | Maximum number of categories |
| NBR | Card | The Scaling example |
| gQ | Handler | Brings data into card |
| LOWEND | Field | Contains the lower number in scale |
| MIDDLE | Field | Contains the middle number in the scale |
| HIGHEND | Field | Contains the high number in the scale |
| RANGE | Var | The difference between the high and low numbers |
| RA | Var | The right answer |
| REF | Var | The text of reference material |
| MARO | Var | Number of arrows/scales to be shown |
| COVER | Field | Hides the scales and arrows that are not shown |
| AC1–5 | Var | Keeps track of who has moved arrows |
| DX | Var | Contains a list of arrow placements |
| ARROW1–5 | Button | The arrow like objects moved |
| ARROWTRACK1–5 | Button | Helps to move the arrows along a track |
| Continue Game | Button | Activates code to go to next round |
| Check Selections | Button | Activates code to check the arrow placements |
|   on mouseUP | Handler | The code for Check Selection |
| NBRCK | Handler | Evaluates the answers |
| onePlayer | Handler | Evaluates the answer in one player mode |
| dragRect | XCMD | Public Domain, lets the user move a rectangle |
| flasher | XCMD | Public Domain, flashes a rectangle |

0

APPENDIX B

Data Records:

Data Record--Ranking Play

```
1    2                          3
H1,   ,Rank the US Wars by number of US war dead with the
       larger on top,
                     4
Ref;The 1989 Information Please Almanac pg 313.
5    6        7          8
R,   ,Civil War,526000,
R,   ,World War II,406399,
R,   ,World War I,116516,
R,   ,Vietnam,58135,
R,   ,Korean War,54246,
R,   ,Revolutionary War,4435,
```

| Field # | Function |
|---|---|
| 1) | The "H1" indicates it's to go into the "H1" field |
| 2) | Not presently used |
| 3) | The text to go into the "H1" field |
| 4) | The reference (not required) |
| 5) | The "R" indicates it's to go into a rectangle |
| 6) | Not presently used |
| 7) | The text to go into the rectangle |
| 8) | A reference (not required) |

Data Record--Grouping Play

```
1    2                          3
H1,   ,Place the Presidential and Vice Presidential candidates
       in their proper party.
                     4
,Ref;The World Almanac
5    6        7
C,   ,Republican
8    9       10
X,   ,Reagan
X,   ,Rockefeller
X,   ,Ford
X,   ,Dewey
X,   ,Agnew
X,   ,Coolidge
X,   ,William J. Bryan
X,   ,Alfred Landon
X,   ,Roosevelt-T
11   12      13
C,   ,Democrat
X,   ,Carter
X,   ,Kennedy
X,   ,Wilson
X,   ,Stevenson
X,   ,Humphrey
X,   ,Mondale
X,   ,Alfred Smith
```

| Field # | Function |
|---|---|
| 1) | The "H1" indicates it's to go into the "H1" field |
| 2) | Not presently used |
| 3) | The text to go into the "H1" field |
| 4) | The reference (not required) |
| 5) | The "C" indicates it's to go into a large object |
| 6) | Not presently used |
| 7) | The text to go into a large object |
| 8) | The "X" indicates it's to go into a small object |
| 9) | Not presently used |
| 10) | The text to go into the small object |
| 11) | Same as 5 |
| 12) | Same as 6 |
| 13) | Same as 7 |

Data Record--Scaling Play

```
1    2                          3
Q,   ,When did Charles A. Linbergh cross Atlantic?
                     4                        5       6
Ref;The 1988 World Almanac And Book of Facts.,1927.389,1900,2000,
```

| Field # | Function |
|---|---|
| 1) | The "Q" indicates it's a question |
| 2) | Not presently used |
| 3) | The question |
| 4) | The reference (Not required) |
| 5) | The answer |
| 6) | A low value for the scale |
| 7) | A high value for the scale |

Appendix C: Reference Numerals and Drawings

FIGS. 1A–3G shows examples of the invention.

FIG. 4 shows the layout of the invention.

FIG. 5 shows a logical flow chart of the method embodied in the invention.

60 computer Central Processing Unit and Memory 61 computer Display Screen 62 computer Pointer Selecting Input Device 68 to 79, steps of Logic Flow Diagram 80 present player's name 82 statement of challenge 84 blocks into which factual material has been placed 86 example of material placed in blocks 90 potential score for correctly placing blocks 92 present player's score 94 first block being moved 96 screen "hand" cursor 98 second block being moved 100 third block being placed 102 the word "RIGHT!" overlaying the screen area 104 the first block placed in the 2nd round with the words "Civil War" in it 106 the second block being moved in the first round of the second player 108 the third block being moved in the first round of the second player 110 the fourth block to be moved in the first round of the second player 112 the words "Sorry! Sorry!"

120 two large blocks 121 sixteen small blocks 122 first small block being moved in a round of play involving the placement of small blocks into larger blocks 124 second small block being moved in a round of play involving the placement of small blocks into larger blocks 126 third small block being moved in a round of play involving the placement of small blocks into larger blocks 130 arrow of first player 132 names of the players in Scaling play 134 scales 136 low range point of scale 138 middle range point of scale 140 high range point of scale
142 scale of first player
144 digital read-out of the location of the first arrow
146 second arrow moved along its scale
148 digital read-out of the location of the the second arrow
150 digital read-out of the location of the third arrow
152 the scale of the third player
154 the answer to the question, reference and results of a round of Scaling play
156 the "Continue Game" button

I claim:

1. A method for testing the knowledge of a person on a machine including a display means, computational means, pointer selecting input means, data storage means, data on said data storage means linked by a characteristic selected from the group consisting of association, linear relationship, magnitude, order, sequence, and hierarchy, comprising the steps of:

(a) displaying a plurality of geometric objects on said display means and copying said data from said storage means to said display means by said machine in such a way as to link units of said data with said geometric objects, (b) directing said person to spatially reposition on said display means said plurality of said geometric objects, so as to represent a predetermined spatial order, (c) repositioning at least one of said geometric objects on said display means in response to said person's manipulating said pointer selecting input means, (d) signaling said computational means to evaluate the repositioning of said geometric objects in response to an action of said person, (e) evaluating said reposition of said geometric objects in relation to said predetermined spatial order, and (f) indicating a result of said evaluation by indicating an amount of award., whereby indicating a greater amount of award if all of said repositioned objects are correctly repositioned, and a lesser amount of award if any one of said geometric object is incorrectly repositioned, thereby indicating to said person an increasing amount of award reflecting an increasing risk associated with said repositioning of an increasing number of said plurality of said geometric objects.

2. The process of claim 1 wherein said geometric objects coincide with said units of data.

3. The process of claim 1 wherein said machine is a computer.

4. A method for testing the knowledge of a person on a machine including a display means, computational means, pointer selecting input means, data storage means, data on said data storage means associated with a characteristic selected from the group consisting of sequence, spatial relationship, magnitude, order, hierarchy, association, organization, classification, possession, attachment, and grouping, comprising the steps of:

(a) displaying geometric objects on said display means and copying said data from said storage means to said display means by said machine in such a way as to link units of said data with said geometric objects, (b) directing said person to spatially reposition on said display means at least one of said geometric objects, so as to represent a predetermined spatial relationship from the group consisting of order, placement, and location, (c) repositioning at least one of said geometric objects on said display means in response to said person's manipulating said pointer selecting input means, (d) signaling said computational means to evaluate the repositioning of said geometric objects in response to an action of said person, (e) evaluating said reposition of said geometric objects, and (f) indicating a result of said evaluation by indicating an amount Of award, whereby indicating a greater amount of award if all of said repositioned objects are correctly repositioned, and a Lesser amount of award if any one of said geometric object is incorrectly repositioned, thereby indicating to said person an increasing amount of award reflecting an increasing risk associated with said repositioning of an increasing number of said plurality of said geometric objects, for the spatial relationships of order and placement from said group of predetermined spatial relationships and amount of award proportional to the closeness of the geometric objects repositioned for the Spatial relationship of location from said group of predetermined spatial relationships.

5. The process of claim 4 wherein said geometric objects coincide with said units of data.

6. The process of claim 4 wherein said machine is a computer.

* * * * *